(12) United States Patent
Knepper

(10) Patent No.: US 6,763,272 B2
(45) Date of Patent: Jul. 13, 2004

(54) SYSTEM HAVING A PROCESS ELEMENT WITH A SCREEN AND AN ACTIVATION ELEMENT FOR REMOTE-CONTROLLED CANCELLATION OF A SCREEN SAVER FUNCTION

(75) Inventor: Achim Knepper, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/386,685

(22) Filed: Mar. 13, 2003

(65) Prior Publication Data

US 2003/0171832 A1 Sep. 11, 2003

Related U.S. Application Data

(63) Continuation of application No. PCT/DE01/03365, filed on Sep. 3, 2001.

(30) Foreign Application Priority Data

Sep. 13, 2000 (DE) .......................................... 100 45 198

(51) Int. Cl.⁷ .............................................. G05B 19/18
(52) U.S. Cl. ............................ 700/65; 700/66; 700/17; 700/83; 340/3.71; 345/700; 345/744; 345/745; 345/866; 345/867; 345/329; 707/4; 707/10; 707/104
(58) Field of Search ............................ 700/56, 65, 66, 700/83, 17; 340/371, 700, 866, 744, 745, 867, 329; 707/104, 4, 10

(56) References Cited

U.S. PATENT DOCUMENTS

| | | | |
|---|---|---|---|
| 4,413,314 A | | 11/1983 | Slater et al. |
| 5,664,110 A | * | 9/1997 | Green et al. .................. 705/26 |
| 5,680,535 A | * | 10/1997 | Harbin et al. ................ 345/473 |
| 5,819,284 A | * | 10/1998 | Farber et al. ................ 709/203 |
| 6,112,225 A | * | 8/2000 | Kraft et al. .................. 709/202 |
| 6,313,878 B1 | * | 11/2001 | Jankowiak .................... 348/377 |
| 6,516,421 B1 | * | 2/2003 | Peters ........................ 713/502 |
| 6,567,411 B2 | * | 5/2003 | Dahlen ........................ 370/401 |
| 6,615,251 B1 | * | 9/2003 | Klug et al. .................. 709/218 |

FOREIGN PATENT DOCUMENTS

| | | | | |
|---|---|---|---|---|
| DE | 198 42 946 A1 | 3/2000 | | |
| EP | 0 389 132 A2 | 9/1990 | | |
| EP | 0860103 B1 | * 8/1998 | .......... H05K/13/08 |
| EP | 0 908 805 A1 | 4/1999 | | |
| EP | 0 927 985 A2 | 7/1999 | | |
| GB | 2 313 924 A | 12/1997 | | |
| JP | 09297676 A | * 11/1997 | ........... G06F/3/153 |

OTHER PUBLICATIONS

"The DOGMA Approach to High–Utilization Supercomputing"; Judd et al.; 1998, proceddings, the seventh International Symposium on, Jul. 28–31, 1998, pp. 64–70.*
"Real Time Detection and Recognition of Human Profile using Inexpensive Desktop Cameras"; Kumar et al.; Pattern recognitio 2000, proceedings, 15 International Conference on, vol. 1, Sept. 3–7, 2000; pp. 1096–1099.*
Dr. Peter Jung, "Fehlerdiagnosis Mit Bildschirm—Textangabe an Sonder–Werkzeugmaschinen", Werkstatt und Betrieb 115 (1982) 6, pp. 365–366.

* cited by examiner

*Primary Examiner*—Ramesh Patel
(74) *Attorney, Agent, or Firm*—Sughrue Mion, PLLC

(57) ABSTRACT

A system including at least one automatically controlled process element (1), in particular an automatically controlled process system, having at least one screen (4) for displaying status data or operational data of said process element (1). The display of the screen (4) is temporarily interrupted by a screen saver function and an activating element (5) is provided for remote-control cancellation of the screen saver function. In addition, an activating element (5) for the system is provided.

19 Claims, 2 Drawing Sheets

SYSTEM HAVING A PROCESS ELEMENT WITH A SCREEN AND AN ACTIVATION ELEMENT FOR REMOTE-CONTROLLED CANCELLATION OF A SCREEN SAVER FUNCTION

This is a Continuation of International Application PCT/DE01/03365, with an international filing date of Sep. 3, 2001, which was published under PCT Article 21(2) in German, and the disclosure of which is incorporated into this application by reference.

FIELD OF AND BACKGROUND OF THE INVENTION

The present invention relates to a system having at least one process element with at least one screen to display data of the process element, provided with a screen saver function.

Process elements, such as devices, machines, or process facilities that have screens to display state/operational data, are known from the prior art. In order to monitor the often-times automatically controlled activity of these types of process elements, it is known, for example, in the fields of petrochemistry or brewing technology, to monitor these process elements by having operators check the state/operational data displayed on the respective screens, e.g. for fault messages. Often these process elements are positioned throughout expansive areas. If there are fault messages, the operator, for instance, initiates appropriate corrective measures. In order to protect the screens used and elevate their service lives, it is known to deactivate the displays of the screens through screen saver functions after an adjustable time period.

Typically, the operator must interrupt the active screen saver function for each individual screen to be monitored, e.g. by pressing a switch, in order to obtain a renewed display of the state/operational data and be able to determine whether an error-free operating state exists. If a large numbers of screens are positioned throughout an expansive area, the operator may have to expend a significant amount of time for this purpose.

It is already known to cancel the display interruption on the screen, effected by one of the described screen saver functions, for a specific time whenever a fault message occurs, in order to draw attention to the fault message. Typically, however, an interruption of this type, arising from the presence of a fault message, has a time limit imposed, to protect the screen. As a result, the operator must initiate the cancellation of the screen saver function on the respective screen again and again to reliably determine whether a fault message is present.

A control system, having a display unit, for an industrial system is known, e.g., from European Patent Application A-0 389 132. According to the teachings of this reference, for example, the color of the screen display on the display unit is modified according to the state or operational data of a process element. Furthermore, European Patent Application A-0 927 985 teaches a device in which the type and density of advertising output on a television screen is controlled as a function of the dwell time of a person in front of the screen. Finally, it is known from the publication "Fehlerdiagnose mit Bildschirm—Textangabe an Sonder-Werkzeugmaschinen [Error Diagnosis Using Screens—Text Display on Special Machine Tools]" by Dr. Peter Jung, published in Werkstatt und Betrieb 115 (1982), pp. 365 and 366, to erase the screen display that is associated with faultless operation upon the occurrence of a fault, and to replace it by a fault message.

OBJECTS OF THE INVENTION

One object of the present invention is to provide a system having at least one process element with a screen and some form of more advantageous activation element for a system of this type. It is a further object to provide such a system with a feature that allows an operator to cancel the screen saver function of the screen of a process element in a time-saving and comfortable manner.

SUMMARY OF THE INVENTION

According to one formulation of the invention, these and other objects are achieved by a system that includes at least one automatically controlled process element having at least one screen to display state or operational data of the process element, the display of the screen being interrupted from time to time by a screen saver function; and an activation element, for remote-controlled cancellation of the screen saver function, having a detection region and activating the display of the screen when a person is detected in the detection region. According to another formulation, the invention provides a system that includes at least one automatically controlled process element; at least one display associated with the process element; screen saver software for the display; and a detector operationally connected to the screen saver software yet physically external to and remote from the process element and the display, wherein the detector controls the screen saver software in accordance with a parameter, other than manual actuation, detected by the detector.

In a system according to the present invention, an activation element for remote-controlled cancellation of the screen saver function of the screen of the process element is provided. In this case, a process element is understood to include, for example, devices, machines, and/or assemblies and, in particular, process systems in, for example, the fields of petrochemistry or brewing technology, which operate essentially automatically.

These types of process elements or process systems are typically sought out at specific intervals by an operator, whereby the screen display, which shows the state/operational data, is examined for fault messages. Whenever fault messages are displayed, suitable measures are taken by the operator, and the system is, for example, switched off until the fault is found and corrected.

The screens, or, stated more generally, the display elements, of these process elements may be implemented as, for example, tube elements or LCD displays. For tube elements, screen savers are known which interrupt the display on the screen after a specific time period. For LCD displays, the background illumination may be switched off after a time delay to preserve the screen.

According to the present invention, an activation element for remote-controlled cancellation of the screen saver function is additionally provided in the system. This element has a detection region and becomes active when a person is detected in the detection region. An operator can therefore, e.g. by entering the area in which the respective process elements are positioned, cause the activation element to be activated and, therefore, the screen saver function of all the associated screens to be cancelled.

In contrast to conventional systems, the cancellation of the screen saver function of the individual screens need therefore no longer be performed at the respective screens.

If multiple screens are provided in the system, it is possible to use one activation element to cancel the screen saver function of multiple screens. In this way, for example, all of the screens which are in the field of view of the operator may be reactivated, so that the operator is able to determine at a glance whether fault messages are present on the screens, i.e. whether faults have arisen with respect to the process elements. The cancellation of the screen saver functions may also occur, for instance, with a time delay, and/or with staggered reactivation, for individual screens or screen groups.

If multiple process elements or an entire process system are to be monitored by the operator, one activation element, for example, may be switched on when the operator enters the processing area. In particular, when the process system operates in an expansive area, multiple activation elements may also be provided. This allows an operator who is traveling on a vehicle, e.g. a bicycle, and seeking out the respective process elements one after another, to pass multiple activation elements, whereby the respective groups of screens are activated by the associated activation element, and the screen saver functions are canceled in groups.

According to the present invention, the activation element is actuated by an operator entering or passing a respective process area. The activation element may therefore be particularly advantageously designed as a floor mat, whereby the remote-controlled activation is triggered when the floor mat is ridden over or stepped upon.

In a further embodiment, the activation element may instead be implemented as a motion sensor and be activated by the appearance of the operator. Alternatively, the activation element may advantageously be implemented as both a floor mat and a motion sensor, in order to achieve particularly reliable activation.

According to a further advantageous embodiment, the activation element can be locked, so that the element is activated only upon input of an appropriate key access by an authorized operator. This key may be implemented as a mechanical key or as an electronic key (for example, by code input).

Particularly advantageous for implementation in a spacious, decentralized process area, the activation element may be connected via a radio connection to the process element(s). Alternatively or additionally, a wire connection may be provided. The activation element can then exchange information signals with the process element(s) via this wired or wireless connection. In particular, communication is thereby enabled with switching elements (e.g., a computer) of the process elements assigned to the screens.

In this case, communication may occur between the activation element and one or more computers which are assigned to the process elements for screen control. The activation element may also be connected to a programmable controller of a process element for screen control.

Advantageously, a deactivation element may be provided, via which the operator can, e.g., reactivate the screen saver functions of the screens upon leaving the process area. A deactivation element of this type may be provided with any or all of the features analogous to those described here and below for the activation element.

The activation element according to the present invention provides, in particular, an especially comfortable cancellation of the screen saver function of the process elements for an operator.

BRIEF DESCRIPTION OF THE DRAWINGS

The present invention is described in more detail on the basis of the drawing, in which.

DETAILED DESCRIPTION OF THE PREFERRED EMBODIMENTS

Figure 1:
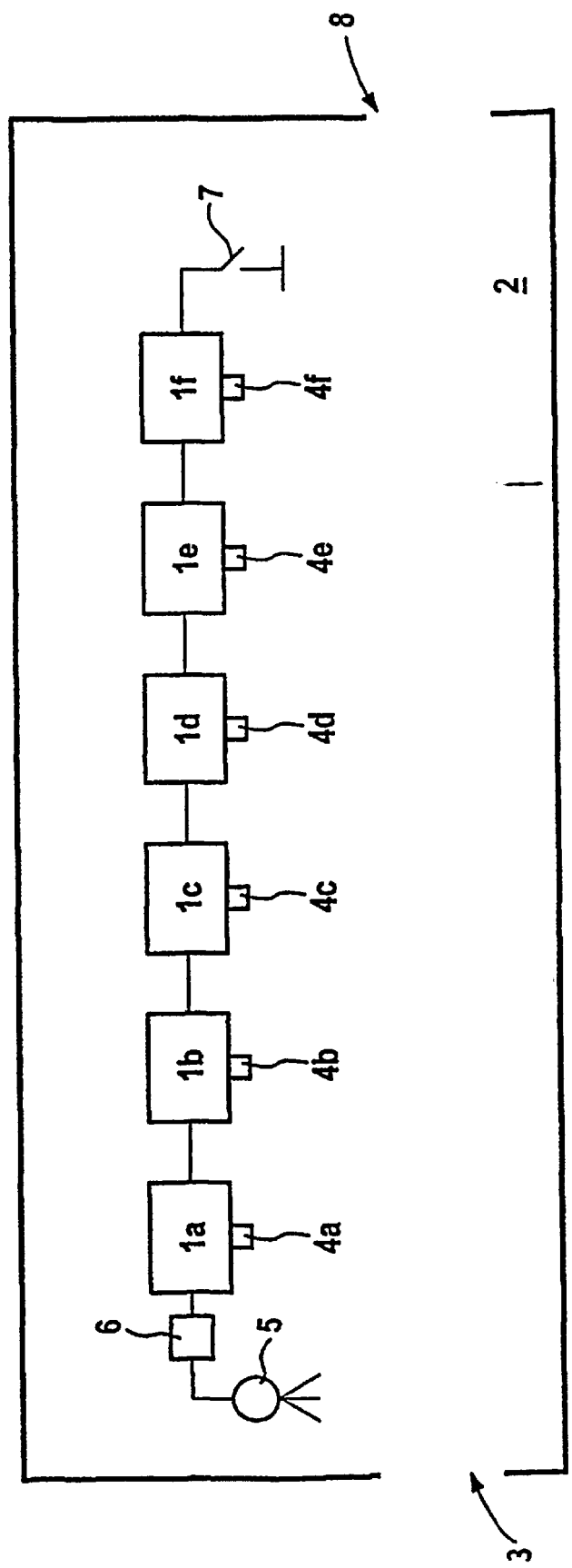
FIG. 1 shows a first embodiment of a system according to the invention.
Figure 2:
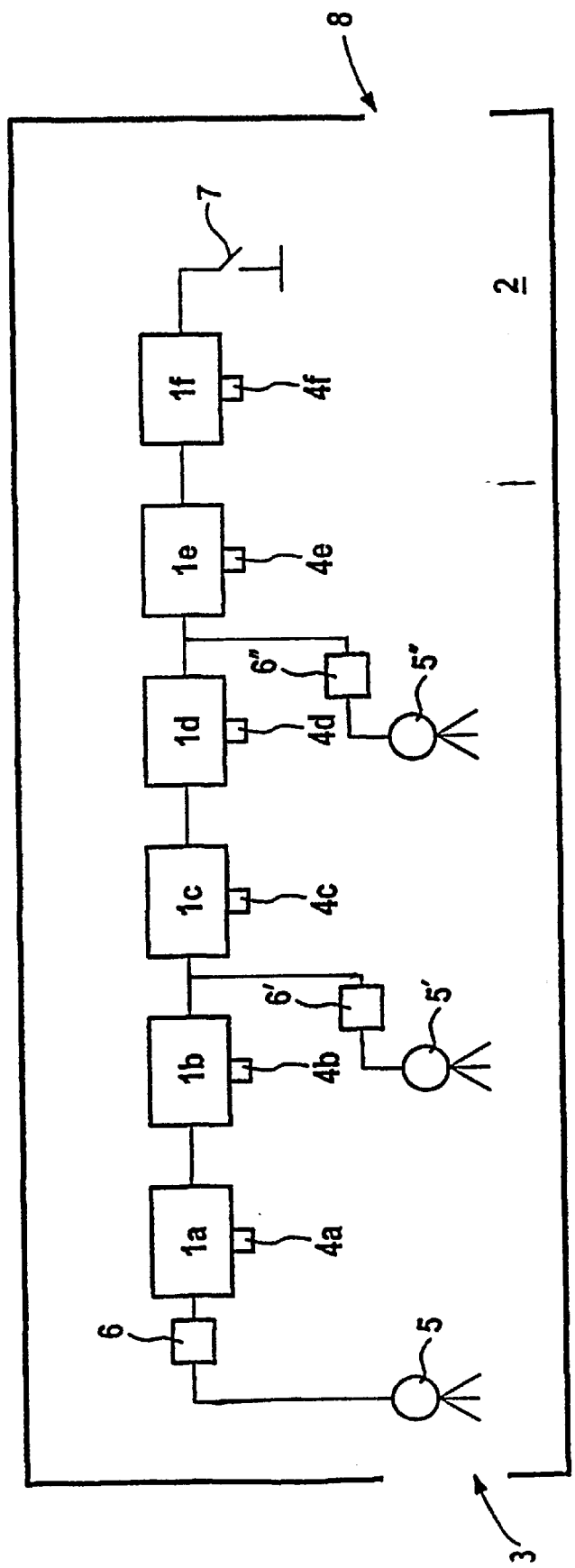
FIG. 2 shows a second embodiment of an inventive system.

FIGS. 1 and 2 show respective systems having process elements 1a-1f, the process elements being linked to one another, e.g., to implement process sequences, in particular automatically controlled sequences, of chemical or manufacturing technology procedures. To monitor these process elements 1a–1f, an operator enters the process chamber 2, e.g. a manufacturing hall, through an entrance 3. Screens 4a–4f for displaying state/operational data of the process elements 1a–1f are attached to process elements 1a–1f. The displays of individual screens or of all the screens 4a–4f are interrupted after an adjustable time delay by means of the screen saver functions described above. With specific reference to FIG. 1, when the operator enters the process chamber 2 through the entrance 3, an activation element 5, which is implemented e.g. as a motion sensor, is actuated. This causes the screen saver functions of the screens 4a–4f to be canceled by remote control, enabling the operator to recognize at a glance whether there are error messages present on the screens 4a–4f. According to a refinement of the invention (an embodiment of which is shown in FIG. 2), multiple activation elements 5–5" may be provided in the process chamber 2 at different stations along the path of the operator as he passes through the process chamber 2.

When the operator has passed through the process chamber 2, a deactivation element 7 may be provided, which is used for remote-controlled reactivation of the screen saver functions of the screens 4a–4f. This occurs if the operator, after he has completed checking the screens 4a–4f, actuates the deactivation element 7 before leaving the process chamber 2 through the exit 8, or enters the detection region of the deactivation element 7, which is implemented e.g. as a motion sensor or a floor mat. If no deactivation element 7 is provided, cancellation of the interruption of the screen saver function of the screens 4a–4f or of individual screens or screen groups may instead occur following a predetermined, e.g. adjustable, time period subsequent to the actuation of the activation element 5. The timespan is set, in particular., to provide the operator sufficient time to walk through or ride through the process chamber 2.

The activation element 5 in the embodiment of FIG. 1 is preferably connected via the switching element 6 to the screens 4a–4f. By way of this switching element 6, the screens 4a–4f can be controlled with a time delay, so that cancellation of the screen saver functions of the screens 4a–4f occurs with staggered time delays and in sequence. In the event of a known movement speed of the operator as he walks through or rides through the chamber 2, the screens 4a–4f are reactivated in sequence, always when the operator has reached the respective screens or is in their viewing field. Such a switching element 6 can also be used to set the respective durations of the time delays for cancellation of the screen saver functions of the screens 4a–4f. In the embodiment of FIG. 2, plural switching elements 6–6", associated respectively with the plural activation elements 5–5", are provided.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A system, comprising:
   at least one automatically controlled process element having at least one screen to display state or operational data of the process element, the display of the screen being interrupted from time to time by a screen saver function; and
   an activation element, for remote-controlled cancellation of the screen saver function, having a detection region and activating the display of the screen when a person is detected in the detection region.

2. The system according to claim 1, wherein the system is an automatically controlled process system.

3. The system according to claim 1, wherein the process element has a plurality of screens, and the activation element is configured to cancel the screen saver functions of the plurality of screens.

4. The system according to claim 3, wherein the activation element is configured to cancel the screen saver functions of the plurality of screens using a time delay.

5. The system according to claim 4, wherein the time delay is mutually staggered, respectively, for the screens.

6. The system according to claim 3, further comprising a switching element connected to the activation element.

7. The system according to claim 6, wherein the switching element controls the number of the screens whose screen saver function is canceled.

8. The system according to claim 3, further comprising at least one additional activation element.

9. The system according to claim 8, wherein the screens are grouped into a plurality of groups, and the activation elements are configured to cancel, respectively, the screen saver functions of the groups of screens.

10. The system according to claim 1, wherein the activation element comprises a floor mat to cancel the screen saver function.

11. The system according to claim 1, wherein the activation element comprises a motion sensor to cancel the screen saver function.

12. The system according to claim 1, further comprising a wire connection connecting the activation element to the process element.

13. The system according to claim 1, further comprising a radio connection connecting the activation element to the process element.

14. The system according to claim 1, wherein the process element comprises a programmable controller connecting the activation element.

15. The system according to claim 1, further comprising a deactivation element, for remote-controlled reactivation of the screen saver function.

16. A system, comprising:
    at least one automatically controlled process element;
    at least one display associated with said process element;
    screen saver software for said display; and
    a detector operationally connected to said screen saver software yet physically external to and remote from said process element and said display, wherein said detector controls said screen saver software in accordance with a parameter, other than manual actuation, detected by said detector.

17. A system, comprising:
    at least two automatically controlled process elements;
    at least two displays, each said display associated respectively with each said process element;
    screen saver software providing a screen saver function for said displays; and
    one detector operationally connected to said screen saver software yet physically external to and remote from said process elements and said displays, wherein said detector controls said screen saver software, in accordance with a parameter detected by said detector, to cancel the screen saver function for both said displays.

18. The system according to claim 17, wherein the screen saver function is cancelled simultaneously for both said displays.

19. The system according to claim 17, wherein the screen saver function is cancelled time-staggered for said displays.

* * * * *